D. H. TUXWORTH.
Clamp for Vehicle-Wheels.
No. 161,997.
Patented April 13, 1875.
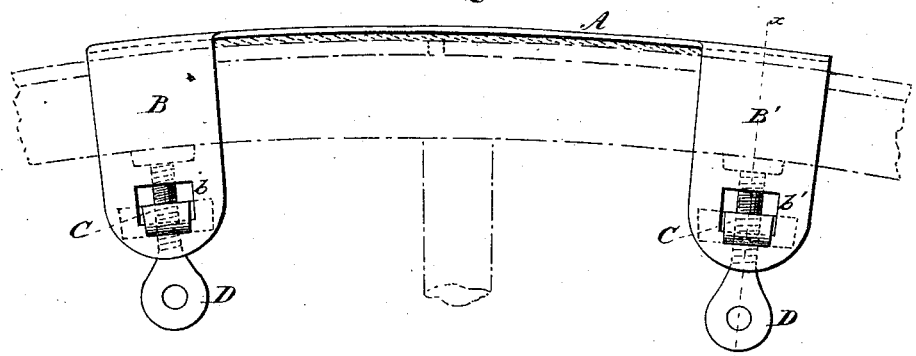
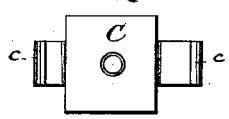
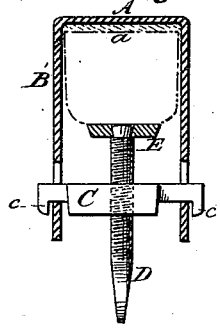
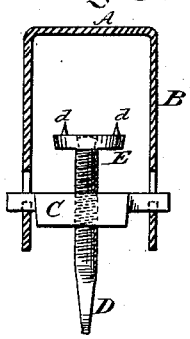
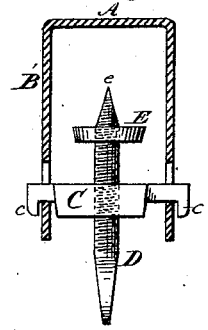
Witnesses:
J. Philip Sindall
C. W. Stevenson
Inventor:
D. Howard Tuxworth

UNITED STATES PATENT OFFICE.

D. HOWARD TUXWORTH, OF BALTIMORE, MARYLAND.

IMPROVEMENT IN CLAMPS FOR VEHICLE-WHEELS.

Specification forming part of Letters Patent No. 161,997, dated April 13, 1875; application filed January 27, 1875.

*To all whom it may concern:*

Be it known that I, D. HOWARD TUXWORTH, of Baltimore city, in the county of Baltimore and State of Maryland, have invented certain new and useful Improvements in Clamps for Wagon-Tires, &c.; and I do hereby declare that the following is a full, clear, and exact description thereof, which will enable others skilled in the art to which it pertains to make and use the same, reference being had to the accompanying drawings, and to the letters of reference marked thereon, which form a part of this specification.

In the drawing, Figure 1 represents a side view of my clamp applied to part of a tire on a wheel. Fig. 2 is a cross-sectional view on line $x\ x$. Figs. 3 and 4 are cross-sectional views of modifications. Fig. 5 is a plan view of the clamp-plate.

The object of my invention is to provide a device, both simple and cheap, that may be readily and easily applied to the tires of buggies, carriages, and other vehicles, when they become broken, especially when some distance from any suitable repair-shop, as is well known by those having experienced this inconvenience.

The invention consists of a slightly curved plate, provided at its ends with downwardly-projecting ears, and a shouldered clamping-plate, with a screw and swivel, which bears against the inside of the felly of the wheel and is clamped in suitable holes in the ears, and thus secures the plate and thereby holds the broken tire in position.

In the drawing, A represents a plate of metal or other suitable material, slightly curved to assimilate to the circumference of a wheel of a buggy, carriage, or other vehicle, and is provided at its extremities with two downward-projecting ears, B B', which have holes $b\ b'$ in them for the reception of the ends of the clamping-plate C. This plate C is provided with the recesses and shoulders $c\ c'$, to fit over the ears B B' transversely, and is forced against the felly of the wheel by a thumb-screw, D. The thumb-screw D has a flat swivel-head, E, on its end, which bears against the inside of the felly and prevents it from becoming bruised by the screw D when it is forced against said felly. The swivel may, however, be provided with points $d\ d'$, as shown in Fig. 3, to prevent it from slipping, or the screw may protrude through the swivel, as shown in Fig. 4, and be provided with a point, $e$. The clamping-plate may be plain instead of shouldered, as shown in Fig. 3. A piece of india-rubber or other flexible material, $a$, Figs. 1 and 2, may be laid in the bottom of the plate to accommodate itself to any irregularity of the tire.

I am aware that clamps with single pairs of ears are not new, but these cannot be employed and applied so readily to a broken tire, especially as they are apt to spring apart, when they break; but—

What I do claim, and desire to secure by Letters Patent, is—

The clamp, consisting of the piece A, having the double pair of ears B B', clamp-pieces C C, and screws D D, all combined as and for the purpose set forth.

In testimony that I claim the foregoing as my own, I hereby affix my signature in presence of two witnesses.

D. HOWARD TUXWORTH.

Witnesses:
J. PHILIP SINDALL,
C. W. STEVENSON.